US009727660B2

(12) United States Patent
Barrell et al.

(10) Patent No.: US 9,727,660 B2
(45) Date of Patent: Aug. 8, 2017

(54) SYSTEM AND METHOD TO AID ASSISTIVE SOFTWARE IN DYNAMICALLY INTERPRETING INTERNET WEBSITES AND THE LIKE

(71) Applicant: Deque Systems, Inc, Herndon, VA (US)

(72) Inventors: Dylan Barrell, Ann Arbor, MI (US); Ian Thomas Kelly, Dexter, MI (US); Christopher Carse McMeeking, Ypsilanti, MI (US)

(73) Assignee: Deque Systems, Inc., Herndon, VA (US)

( * ) Notice: Subject to any disclaimer, the term of this patent is extended or adjusted under 35 U.S.C. 154(b) by 308 days.

(21) Appl. No.: 13/622,897

(22) Filed: Sep. 19, 2012

(65) Prior Publication Data

US 2013/0073949 A1    Mar. 21, 2013

Related U.S. Application Data

(60) Provisional application No. 61/536,366, filed on Sep. 19, 2011.

(51) Int. Cl.
*G06F 3/00* (2006.01)
*G06F 17/30* (2006.01)
*H04L 9/32* (2006.01)
*G06F 21/62* (2013.01)

(52) U.S. Cl.
CPC .... *G06F 17/30905* (2013.01); *G06F 21/6218* (2013.01); *H04L 9/3263* (2013.01)

(58) Field of Classification Search
CPC .............. G06F 17/30899; G06F 3/0481; G06F 17/30867; G06F 3/0487; G06F 3/0482; G06F 17/30861

USPC ................................ 715/234, 243, 254, 255
See application file for complete search history.

(56) References Cited

U.S. PATENT DOCUMENTS

| | | | |
|---|---|---|---|
| 6,895,551 B1 | 5/2005 | Huang et al. | |
| 7,047,487 B1 | 5/2006 | Bates | |
| 7,246,041 B2 | 7/2007 | Fukuda et al. | |
| 7,448,023 B2 | 11/2008 | Chory et al. | |

(Continued)

FOREIGN PATENT DOCUMENTS

| | | |
|---|---|---|
| WO | 2005071568 A1 | 8/2005 |
| WO | 2011/130839 A1 | 10/2011 |

OTHER PUBLICATIONS

Kawanaka et al. "Accessibility Commons: A Metadata Infrastructure for Web Accessibility", ASSETS'08, Oct. 13-15, Halifax, Nova Scotia, Canada, pp. 153-160, 2008.

(Continued)

*Primary Examiner* — Kyle Stork
(74) *Attorney, Agent, or Firm* — Dinsmore & Shohl LLP

(57) ABSTRACT

Disclosed is a system and method for modifying the presentation of content and/or graphical elements and behavior of a digital presentation (e.g., a webpage) by identifying an information event and dynamically overlaying a fully functional complementary presentation of the digital presentation, without accessing the underlying source code of the digital presentation, employing a special software or equipment (e.g., a special web browser), or requiring that original or user submitted content associated with the digital presentation be transmitted to a remote or otherwise uncontrolled server.

39 Claims, 6 Drawing Sheets

(56) References Cited

U.S. PATENT DOCUMENTS

| | | | |
|---|---|---|---|
| 7,451,391 B1 | 11/2008 | Coleman et al. | |
| 2002/0156799 A1 | 10/2002 | Markel et al. | |
| 2002/0167534 A1* | 11/2002 | Burke | 345/629 |
| 2004/0148568 A1 | 7/2004 | Springer | |
| 2005/0160065 A1 | 7/2005 | Seeman | |
| 2005/0216471 A1 | 9/2005 | Yee et al. | |
| 2006/0277250 A1 | 12/2006 | Cherry et al. | |
| 2006/0294457 A1* | 12/2006 | Bales | G06F 17/3089 715/201 |
| 2007/0074167 A1 | 3/2007 | Cohrs et al. | |
| 2008/0155411 A1 | 6/2008 | Christensen | |
| 2008/0155691 A1* | 6/2008 | Fossen et al. | 726/22 |
| 2009/0252319 A1* | 10/2009 | Vesta | H04M 3/5175 379/265.03 |
| 2010/0131797 A1 | 5/2010 | Ganesh et al. | |
| 2010/0268809 A1 | 10/2010 | Ganesh et al. | |
| 2011/0252299 A1* | 10/2011 | Lloyd | G06F 17/246 715/212 |

OTHER PUBLICATIONS

Borodin et al. "What's New?—Making Web Page Updates Accessible", ASSETS '08, Oct. 13-15, Halifax, Nova Scotia, Canada, pp. 145-152, 2008.

Bigham et al. "Accessmonkey: A Collaborative Scripting Framework for Web Users and Developers", W4A2007—Technical Paper, May 7-8, Banff, Canada, pp. 25-34, 2007.

Computer Society, Proceedings of the 3rd Internatioanl Workshop on Web Site Evolution (WSE'01), Improving Web Accessibility for Visually Handicapped People Using KAI, Mercedes Macias, Fernando Sánchez, 6 pages.

\* cited by examiner

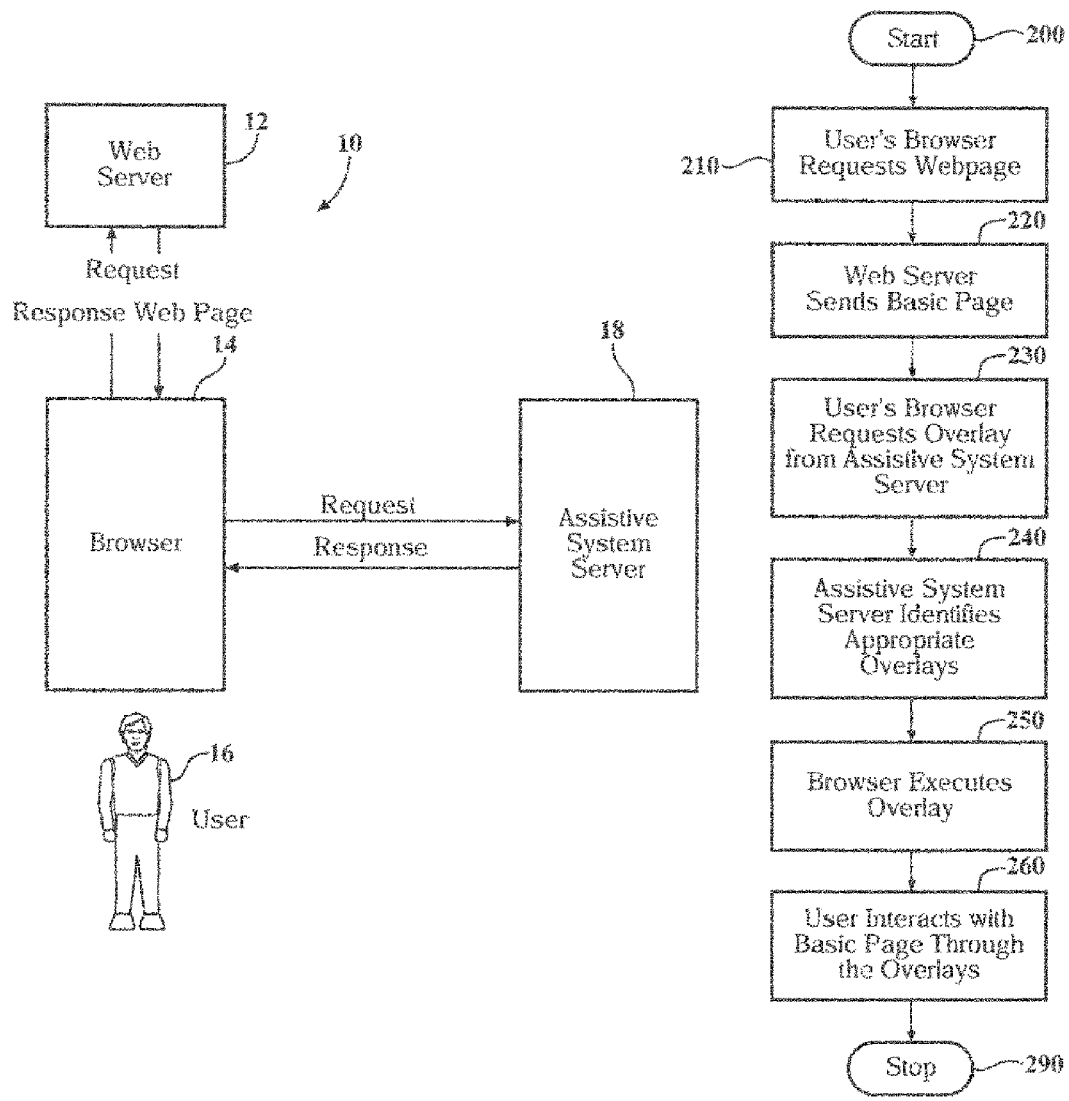

FIG. 3
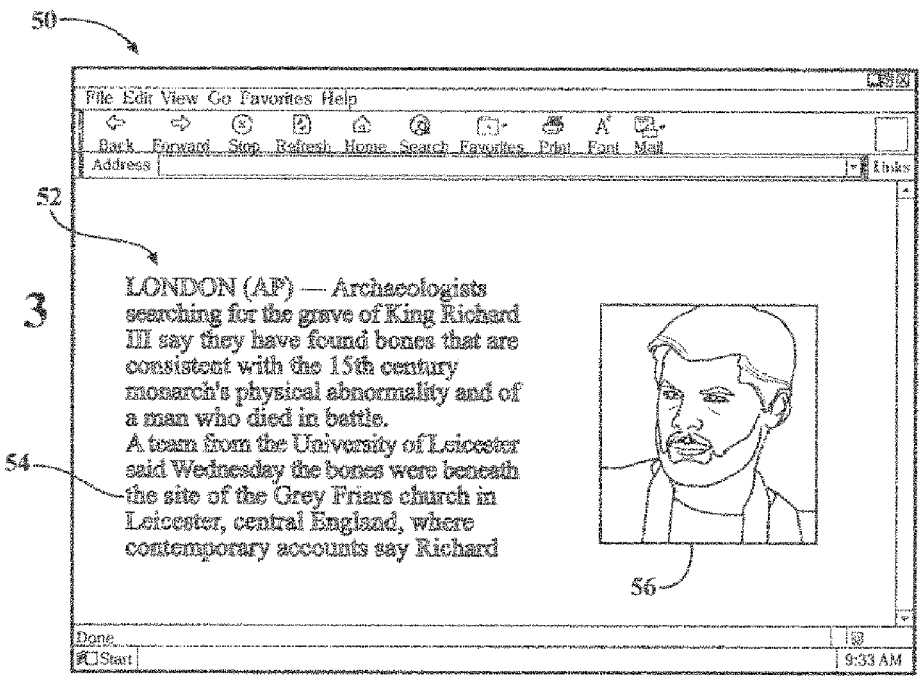
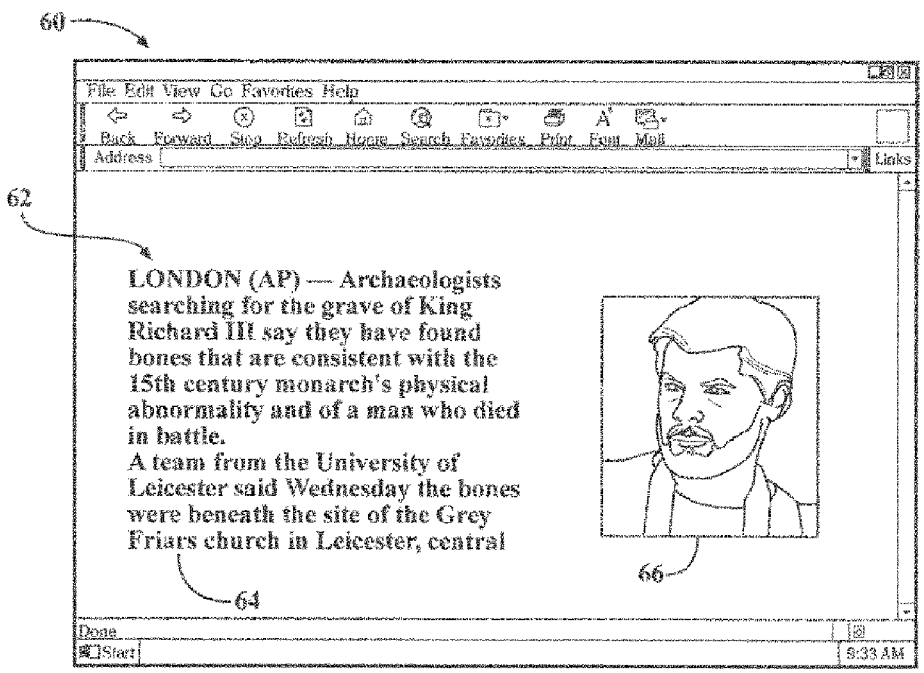

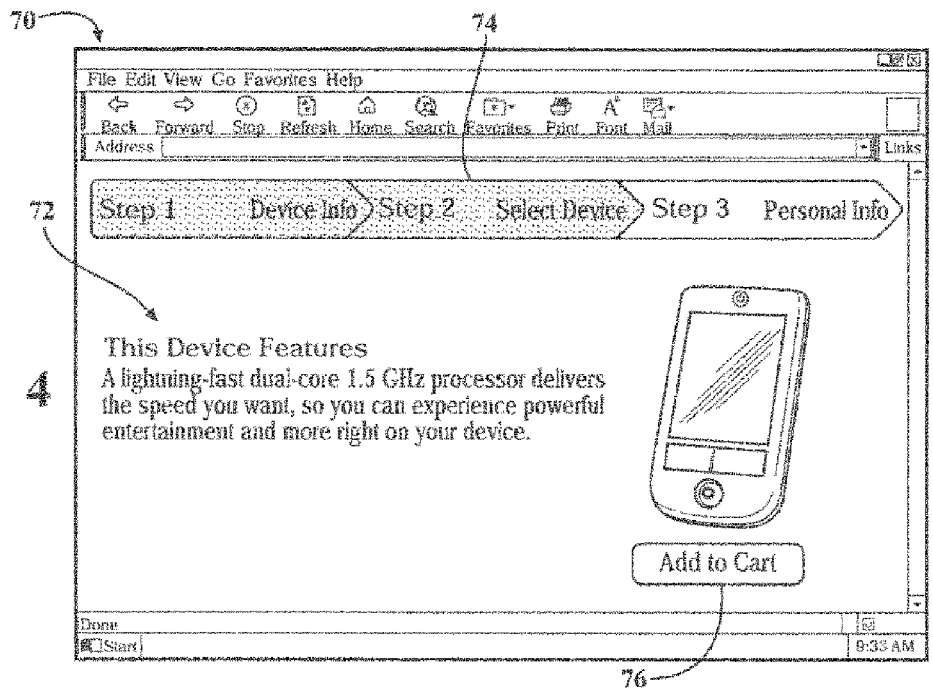
FIG. 4
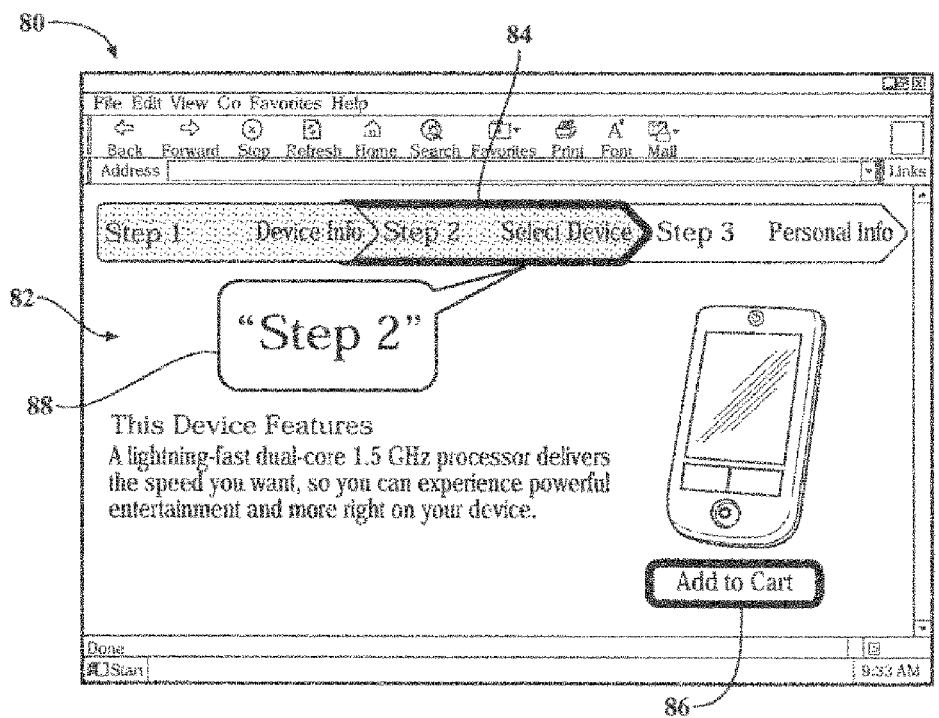

FIG. 5

SYSTEM AND METHOD TO AID ASSISTIVE SOFTWARE IN DYNAMICALLY INTERPRETING INTERNET WEBSITES AND THE LIKE

CROSS-REFERENCE TO RELATED APPLICATIONS

This application claims priority from U.S. Provisional Application No. 61/536,366, filed Sep. 19, 2011, the disclosure of which is incorporated by reference herein in its entirety.

FIELD OF THE INVENTION

Disclosed is a system and method for modifying the presentation of content and/or graphical elements and behavior of a digital presentation (e.g., a webpage) by identifying an information event and dynamically overlaying a fully functional complementary presentation of the digital presentation, without accessing the underlying source code of the digital presentation, employing a special software or equipment (e.g., a special web browser), or requiring that original or user submitted content associated with the digital presentation be transmitted to a remote or otherwise uncontrolled server.

BACKGROUND OF THE INVENTION

Access to digital information, particularly Internet websites, and other web based content and multimedia documents is critically important in the modern world. In the field of elementary education, for example, it is axiomatic that children who have access to the Internet may academically leave behind children who do not have access to the Internet. In the world of business, access to multimedia presentations, social networking sites, and the like can be the difference between success and bankruptcy. However, despite the important role information access has in society, it is clearly the case that all members of the public do not have equal access to information, especially with regards to the Internet.

Access to the full range of information available on the Internet can be particularly difficult for persons with physical or mental disabilities. For example, a person with a sight impairment may have difficulty reading on-screen text, and a person with a hearing impairment may be unable to respond to audible prompts. Assistive software and applications are available that are capable of converting online information into a format that may be perceived by any impaired user, such as those that convert text to voice. Unfortunately though, assistive software does not always provide a complete remedy.

A concern with the available Internet landscape is that in order for the assistive technology to correctly interpret a page on a website, that page must be coded with information that is not required for use by users without certain disabilities. Many providers of web sites and web applications forget to supply this information, or they code it incorrectly. In addition, a great many sites have dynamic events/functions, including things such as instant messaging, automatic updates, or search suggestions. New and different coding requirements need to be followed for these dynamic sites and functions to be interpreted correctly by the assistive technology. And, the programmers of these sites, having not grasped the correct encoding for static pages, may be at a further disadvantage when confronted with dynamic coding requirements. The result is that entire sites, along with the site's dynamic events/functions, may be or become totally unusable by persons with disabilities.

Using an online social networking service as an example, a user homepage may include a rich graphic display of content and dynamic events (e.g., chat). Some of that content, such as text, may be properly interpreted by available assistive software. However, the software may overlook other information, images, and data. Also of concern is that assistive software may not react to the dynamic events, such as the appearance of a friend request notice or instant messaging communication. A friend request, for example, may take the form of a small, red, numeric graphic or "jewel" that appears along the top of the homepage. The "jewel" may not be keyboard focusable, meaning one cannot tab a cursor on to the graphic to select it and rendering it unusable by the assistive software. Additionally, even if the assistive software detected the "jewel, it may not be read and/or properly interpreted by the software. For example, while the jewel in practice may not be visually displayed, the related programming code for the jewel may be either functioning or detectable by the assistive software. If a user has no friend requests pending, the website could visually display nothing (the absence of any visual indication meaning that no friend requests are pending). For a normal user this selective display of the jewel is unimportant. However, not being able to see the graphic, the lack of a textual representation as to the meaning of the missing visual may prove highly confusing to the assistive software and result in confusion for the user.

Prior efforts to address online access to information have included the generation of accessibility guidelines. Among the guidelines used are those of section 508 of the Rehabilitation Act of 1973, as amended, 29 U.S.C. 794d. Section 508 requires that when Federal agencies develop, procure, maintain, or use electronic and information technology, Federal employees with disabilities have access to and use of information and data that is comparable to the access and use by Federal employees who are not individuals with disabilities, unless an undue burden would be imposed on the agency. Section 508 also requires that individuals with disabilities, who are members of the public seeking information or services from a Federal agency, have access to and use of information and data that is comparable to that provided to the public who are not individuals with disabilities, unless an undue burden would be imposed on the agency. As more and more websites move to a web 2.0 format and/or integrate HTML5, it will become more difficult to comply with guidelines like Section 508.

In addition, as overall Internet use has increased, more users routinely enter sensitive information like social security numbers, financial account information, and personal information into webpages. The security of this information is of paramount concern to both businesses and private individuals as they try to balance the convenience and accessibility of online commerce with the threat of identity theft. A common means of fraud involves gaining unauthorized access to the webpage code and then carefully modifying the webpage to record user inputted data without changing the presentation of the webpage. Users then access the page, unaware of the security breach, and unknowingly have their information stolen. As such, businesses are justifiably reluctant to permit third parties to access their webpage source code due to the increased risk of a security breach.

In view of at the above, there exists a need for a system and method that improves the presentation of webpages viewed with assistive software. In addition, the system should be configured so that it that does not require access to the underlying code, the use of a special browser or the transmission of customer data or the source code of the website to a remote/third party location that may (or may not) be secure.

U.S. Patent Application Publication No.: US 2005/0160065 A1 to Seeman disclosed the use of a rendering system for use in converting websites so that they may be better interpreted by assistive software. Seeman, for example, described the use of an accessibility engine that used a resource-specific knowledge base and user preferences to convert a resource, such as a website, into an improved accessibility resource. The resource specific knowledge included content and formatting information that reduced ambiguities, translated implied information into explicit information, and improved the accessibility of the resource content. The user preferences represented the physical capabilities of a user's access device, and the user's semantic and personal preferences for how content should be displayed. An editor was also provided that used an annotation wizard to create the resource-specific knowledge base based on the original resource. However, while Seeman addressed issues related to the interaction of assistive software and website, what Seeman proposed was a static solution that may not permit the software to interpret dynamic or interactive events that occur on a site.

Another static-type solution was proposed in a paper by Macias and Sanchez entitled "Improving Web Accessibility for Visually Handicapped People Using KAI," WSE, pp. 49, 3rd International Workshop on Web Site Evolution (WSE'01), 2001. In the paper the authors disclosed alternative means of increasing the accessibility of websites and described the use of "KAI", an accessibility kit for the Internet that considered both the user and the designer. According to the authors, the KAI could classify different components of a published Web page and present them to a user according to his/her needs. At the same time, the KAI improved a user's accessibility by using a BML (Blind Markup Language) that helped the authors develop better structured pages.

SUMMARY OF THE INVENTION

Disclosed herein is a method for identifying attributes in an application's user interface that are intended to convey visual information to a user of that application and, utilizing those attributes, and associated or additional information, to dynamically and statically convey the same information to users of assistive technology that may otherwise be unavailable. The method includes an assistive system server that communicates with a web user's browser to overlay a modified version of a webpage. The assistive system server may comprise a production server, a repository file system, a certificate validation server, and a security monitor with a copy of the repository file system.

In one embodiment, the method may be applied when a webpage has already been deployed so as to dynamically modify the presentation of the website (or other digital presentation) in the user's browser (or the like) without altering the source code of the webpage. In order to apply the information while the application is running, the method may monitor changes in the webpage's user interface and then evaluate those changes looking for fingerprints unique to that webpage that are of interest for the purposes of making the features of the webpage accessible. The sum of the implementation of this technique for a particular webpage may be called the "overlay", which "overlay" can modify at least one of the presentation, content, or behavior of the webpage.

Also disclosed is a delivery method, whereby the overlays are delivered into the running webpage. There are three methods for delivery. In one method the overlays are included in the webpage. This has the advantage of being controllable and verifiable by the quality and security teams of the webpage owner and might be preferred by applications such as online banking. This method may require control over the webpage but does not require the user to install anything. In the second method, the overlays are loaded dynamically from the assistive system server through the inclusion of a small piece of HTML/XHTML and associated JavaScript. This has the advantage of allowing updates to be made to the overlays independently of the updates being made to the webpage, allowing improvements, bug fixes and enhancements to be delivered more quickly. This method may also require control over the webpage but does not require the user to install anything. In a third method, the overlays are made by an app or a plug-in "App" that is running on the webpage user's device. The Apps can take the form of a browser plug-in, browser-provided functionality, or as a separate application on the user's device. The overlays could be delivered either statically as part of this App, or they could be downloaded dynamically by the App. This method would not require control of the webpage (or the like) but may require the user to install the App. It may also be used to make third party web applications accessible without the involvement or knowledge of the third party.

The system also includes several measures to prevent unauthorized access to webpage content and personal user information. A first security measure involves checking the overlays stored in the repository file system of the production server against one or more signature files which contain a digitally signed cryptographic hash values calculated from the content of the overlay files. Approved persons using a personal private key from a public/private key pair create the signature files. This is a first measure of defense against transmitted fraudulent or unauthorized overlays. A second security measure involves checking the signature files against the public key of the approved persons from the certificate validation server (CVS). This ensures that the webpage owner approves each specific overlay before the production server can transmit it. A third security measure known as a security monitor systematically checks the integrity of the overlays transmitted by the production server. The security monitor has a separate copy of all the overlays in the repository file system and acts as a test user by simulating the browsing of the webpages associated with the overlays. This measure provides another layer of security by again validating the integrity of the overlays on the user's end and actively searching for improper overlays.

It will be appreciated that different/separate individuals should have access to the production server, monitoring system and the CVS. In this way, no one individual can modify the overlays transmitted by the production server without additional approval. Also, the security monitor is ideally distantly located relative to the production server and CVS so that it can remain independent. Finally, the system does not store or upload any user information entered into the underlying webpage, nor does the system transmit any of the original webpage's code or content.

This application incorporates by reference herein in its entirety the disclosure of U.S. Provisional Application No. 61/536,366, filed Sep. 19, 2012.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 depicts the interactions between a web server, a web user's browser, and the assistive system server;

FIG. 2 is a flowchart of an embodiment of the system and method;

FIG. 3 is a comparison between browser windows with and without overlays depicting text with corrected contrast;

FIG. 4 is a comparison between browser windows with and without overlays depicting an advancement feature and a progress bar;

FIG. 5 is a comparison between browser windows with and without overlays depicting user information boxes and user interface elements with dynamic behavior registered through event handlers;

DETAILED DESCRIPTION OF THE INVENTION

Figure 6:
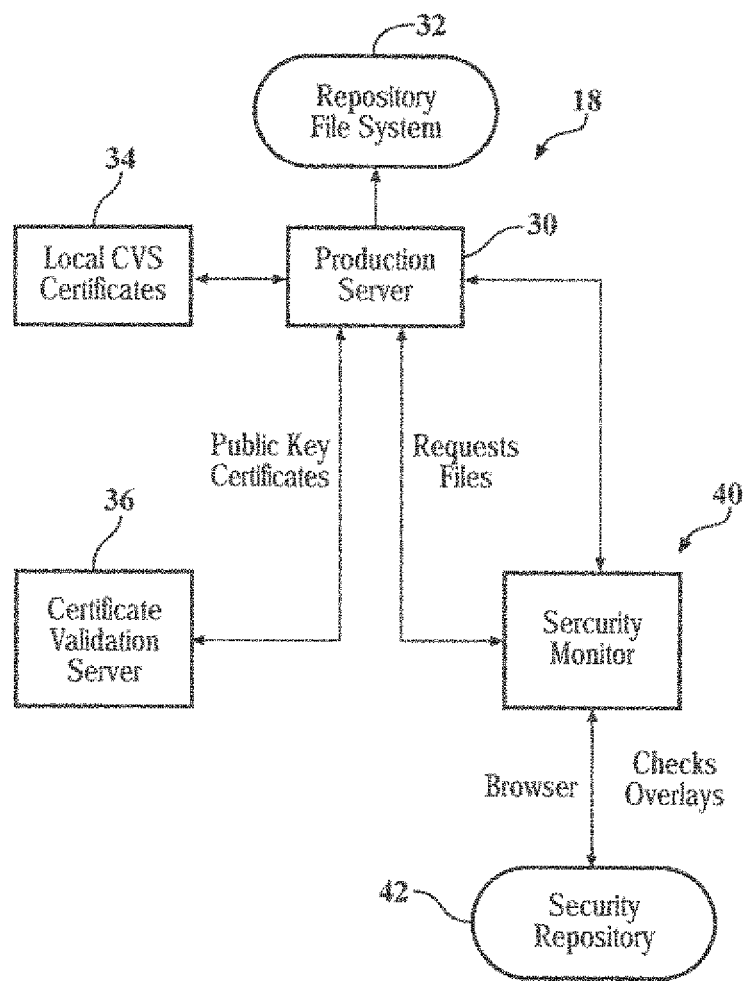
FIG. 6 depicts the organization and interactions within the assistive system server including the system security.

Referring now to FIG. 1, a system and method 10 is disclosed for modifying the presentation of the content and/or graphical elements of a webpage (or like digital presentation) by identifying an information event and causing the overlaying of a fully functional complementary presentation of the webpage without accessing the underlying source code of the webpage, employing a special web browser, or requiring that original or user submitted content from the webpage be transmitted to a remote or otherwise uncontrolled server. The system may include a web server 12 for hosting a webpage, a browser 14 (the server 12 and browser 14 individually or collectively being remote stations) that may be enabled with assistive software displaying a webpage to a user 16, and an assistive system server/production component 18 for executing the disclosed method.

The disclosed assistive system server/production component 18 may include hardware such as a processor, a database, and memory, and be operable to transmit, process, and receive digital information. The web server 12 may host the website that the user 16 wishes to access through their browser 14 and may usually be under the control of the website owner. The assistive system server/production component 18 executes a method that results in a modification of the presentation of webpage of the web server 12 within the user's browser 14. While the assistive system server/production component 18 results in the modification of the presentation of the webpage, it does not transmit, receive, store, or act as an intermediary for any of the transmissions that would normally occur between the browser 14 and the web server 12. Instead, the assistive system server/production component 18 may use an overlay (or the like) to improve the ability of people with disabilities using assistive software to access the webpage and its functions.

An overlay may be a file that, when executed, may result in graphical, functional, or both, modifications to a webpage's presentation within a browser 14 that are implemented in cooperation with the assistive system server/production component 18. When the assistive system server sends an overlay that reaches a user's browser, the overlay results in the modification of the presentation of the webpage to enable the proper presentation by assistive software. These adjustments may also call out areas of importance to the assistive software while modifying the overall presentation of the webpage. The calling out of areas of importance to the assistive software may be accomplished by detecting a digital fingerprint associated with the areas of importance of the webpage that are modified by the overlays.

The detection of a digital fingerprint may be accomplished by the prior identification of one or more fingerprints associated with that element. In this process, elements in a selected webpage that need to be modified by overlays are identified by manually inspecting the webpage. Using the assistive software on the basic webpage and noting any elements that are not properly interpreted by the software may further accomplish identification of defects. Alternatively, or additionally, the basic webpage may be evaluated for its compliance with accessibility standards using commercially available accessibility analysis software.

As seen in Table 1 below, following identification of the fingerprint, logic that may be triggered by the fingerprint may be generated to address the defect.

TABLE 1

| Event(s) | Fingerprint | Logic performed by conversion interface |
|---|---|---|
| load | Look for element with one of the following ids: messagesCountWrapper, notificationsCountWrapper or requestsCountWrapper | 1) Create a new span tag with a text that describes the number and add it to the element off-screen<br>2) Set the element's parent's tabindex to 0 so that it is in the tab order and can receive keyboard focus<br>3) Set the element's parent's role to "button" so that the keyboard interaction works correctly when JAWS is running<br>4) Set the element's parent's parent's class to "fbJewel hasNew" so that the number is always displayed visibly and available to the AT<br>5) Push the element onto the list of elements to be monitored for keyboard interaction and add |

TABLE 1-continued

| Event(s) | Fingerprint | Logic performed by conversion interface |
|---|---|---|
| | | a keyboard handler to the document to intercept the keypress and click events. |
| click | The target of the click is one of the list of elements to be monitored otherwise if it is a span element, then assume its parent is the target and repeat the above evaluation. Repeat this until the element is one on the list or it is not a span element. | 1) Fetch the 'name' attribute from the element 2) Redirect the browser to the appropriate view depending on the value of the name element (the view will be a list of messages, list of friend requests or a list of other notifications. |
| keypress | Same as for click above | 1) Make sure that the keypress is the return or enter key and if it is, perform the same logic as for the click above. |
| DOMNodeInsertedIntoDocument DOMNodeInserted DOMNodeRemoved DOMNodeRemovedFromDocument DOMAttrModified DOMCharacter DataModified | Target is a DIV element and target's class attribute contains the string "fbJewel" but does not contain the string "hasNew" | 1) Set the target's class attribute to "fbJewel hasNew" (this will ensure that if the facebook application logic updates the number and resets the state as a result of the number change, that the jewel's text will remain accessible to the AT) |

With reference now to FIG. 2, a flowchart depicting a series of exemplary interactions between the web server 12, browser 14, and assistive system server 18 from FIG. 1 is shown. The process may begin with step 200. In step 210 the user's browser 14 requests the standard webpage from the web server 12 and the web server 12 sends the standard webpage to the browser 14 in step 220. The web server 12, browsers, or both may have been previously modified to include a presentation instruction, such as expression or function instruction (e.g., a Java® script or like executable file) that, as will be described infra, may be used by the assistive system server/production component 18 to transmit the proper overlay.

After the assistive system server 18 receives the overlay request from the browser 14 in step 230, it identifies the appropriate overlays, step 240, and sends the overlays to the browser 14 where they are executed in step 250. At step 260, the user interacts with the basic webpage through the overlay. Depending on the particulars of the webpage, the assistive system server 18 may continue to standby in the event that the browser 14 requests additional overlays, returning to step 230, but in the event that overlays are not necessary the process is complete and there is no further interaction. One skilled in the art will appreciate that the process described in FIG. 2 may be a simplified depiction of the standard interactions between host servers and users on the Internet and understand that additional iterations of the steps may used in certain circumstances. The purpose of the flowchart is to demonstrate when the request for the overlays is made with respect to the user's 16 interaction with the original webpage through the overlay. The interactions may also result in additional requests to either the original server 12 or to the assistive system server 18 depending on the interpretation of the overlays within the user's browser 14.

The assistive system server 18 delivers several different kinds of overlays to be executed by the browser 14 including static and dynamic overlays. Static overlays are delivered to the browser 14 by the assistive system server 18 and are executed in step 250 after the browser has loaded the basic webpage. Static overlays modify the content, presentation, and behavior of webpage elements such as graphics or text and are executed only once. For example, a static overlay that changes the font of a webpage would only need to be executed once when the page loads. In contrast to static overlays that are executed only once, dynamic overlays may be executed multiple times by the browser 14.

Dynamic overlays are two part overlays that have a decision maker component and an overlay component. The decision maker component continuously monitors the webpage for dynamic changes and decides whether to execute its associated overlay when a change is detected. The overlay component function much like the static overlay described above and modifies the content, presentation, and behavior of elements in the webpage. For example, a webmail site may have an icon that alerts the user 16 when they have a new message. By default, these icons may not be keyboard focusable and their text may be set to display "none" making the text invisible to most assistive technology. After identifying this element as one to monitor, a dynamic overlay may be created with decision maker code that executes its overlay when the new message icon changes state. The dynamic overlay may then be loaded by the browser 14 in step 250 and begins continuously monitoring the webpage for dynamic changes. When the decision maker code detects that the new message icon is active it will execute the overlay to modify the content, presentation, and behavior of the webpage and enable the assistive software to present the alert to the user 16. One skilled in the art will appreciate that in addition to the present example, many different types of dynamic overlays can operate simultaneously throughout a webpage to modify the content, presentation, and behavior of the webpage.

Figure 5:
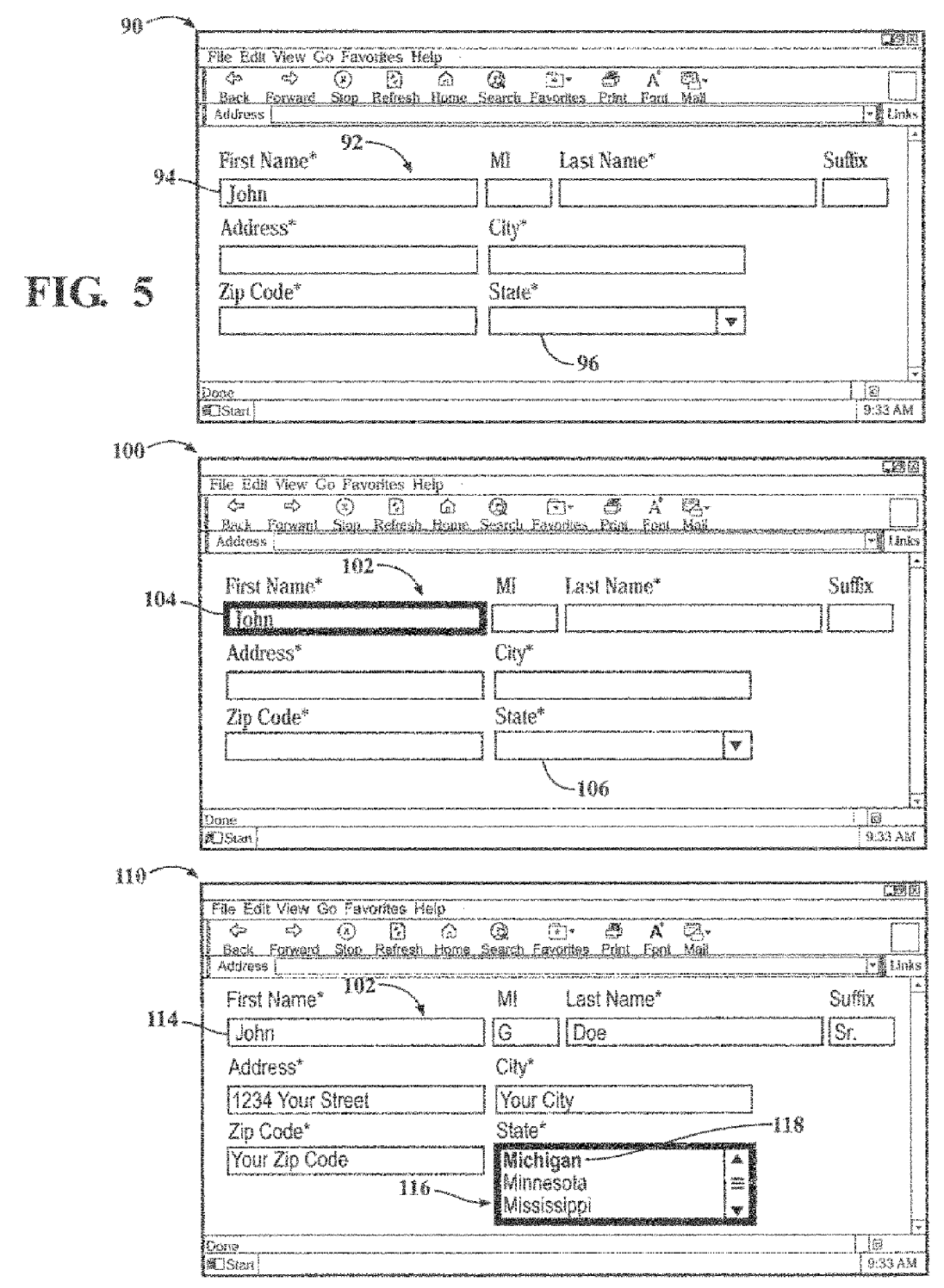

With reference now to FIGS. 3-5, the steps for identifying features on a webpage to be modified by an overlay along with the functional capabilities of the overlay will now be discussed. First with reference to FIG. 3, two browser windows are shown: a first browser window 50 displaying a basic webpage 52 and a second browser window 60 displaying a webpage with text overlay 62. The basic webpage 52 includes unmodified text 54 and a graphic 56. One of the goals of assistive software is to make webpages easier for people with disabilities to use. In this example, the unmodified text 54 is in a font, style, or color that may be more difficult to read. A solution that changes the contrast of the entire page may work to fix the unmodified text 54, but would adversely impact the graphic 56. The presently disclosed method provides a way to correct the text of the webpage with as little modification to the overall webpage presentation by first identifying the individual features that need to be corrected and then selectively applying an overlay to address those features.

Using the presently disclosed method, the webpage would first be manually analyzed and a presentation instruction or the like may be created that provides for an overlay that improves contrast of the unmodified text 54 but does not modify the graphic 56. An example of how the basic webpage can be modified using an overlay is shown in the second browser window 60. The user's browser 14 picks up the instruction from the basic webpage 52 sent by the web server 12 and then requests the webpage text overlay 62 from the assistive system server 18. The presentation of the basic webpage 52 is modified so that the overlaid text 64 is more readable while the second graphic 66 is unaffected.

Now with reference to FIG. 4, two browser windows are shown: a third browser window 70 showing a basic progress webpage 72 and a fourth browser window 80 showing a webpage with overlaid expressions 82. The basic progress webpage 72 is what a user will typically see when conducting business through a webpage. The webpage features a progress bar 74 that shows the step the user is on along with the total number of steps as well as a clickable button 76 to advance to the next screen. While current assistive software may allow the user to select the clickable button 76, many do not alert the user to what step they are on with respect to the progress bar 74. Disabled users may not be aware of secondary features on webpages like the progress bar 74 because the assistive software overlooked such features or is unable to detect their presence on the webpage. The presently disclosed method provides a way to alert the assistive software to the unique features found on the basic progress page 72 by identifying the individual features of interest and then applying an overlay to highlight those features.

As with the previous example, the progress webpage 72 would be manually analyzed for features of interest to assistive software and instructions would be created to provide notice of the progress bar 74 and clickable button 76. A progress bar overlay 82 could then be applied on top of the basic progress window 72 that points out the highlighted progress bar 84 as well as the highlighted clickable button 86. Furthermore, the overlay could contain an instruction to cue an audiovisual notice 88 that the user was on "Step 2" or "Step 2 out of 3." Again, the presentation of the basic progress webpage 72 seen in the third browser window 70 is modified to facilitate the conversion of the webpage to a form better suited for use by disabled persons without modification to the underlying webpage.

While the clickable button 76 is highlighted 86 by the progress bar overlay 82, the user's interaction remains with the basic progress webpage 72. When the user selects the highlighted clickable button 86 in the fourth browser window 80, the transmission is not routed through the assistive system server 18 but instead goes straight to the web server 12, as if the progress bar overlay 82 was not there at all. The assistive system server 18 may be put on notice of the need for a subsequent overlay based on the previous overlays requested by the browser 14 or an instruction to the same effect, but the user's interactions remain exclusively with the underlying web server 12.

Now with reference to FIG. 5, three browser windows are shown: a fifth browser window 90 showing a basic address form webpage 92, a sixth browser window 100 showing an address form webpage overlaid with expressions 102, and a seventh browser window 110 showing an address form webpage overlaid with dynamically inserted styling information 116. The basic address form webpage 92 is typical of what a user may expect to see when filling out an online form and features boxes for the user to fill in their name 94 and other information along with a selectable drop-down for the state 96. Informational boxes like those for a user's name 94 generally present little issue for assistive software because they can usually be selected with standard keystrokes like "tab." The drop down for the state 96 however can be more difficult for assistive software to interpret and may even be handled improperly causing the page to update confusingly when operated using the keyboard. These features may not be accessible with a keyboard or disabled users may have trouble navigating the drop-down 96 because the form is submitted or is updated before they are finished making their selection. The presently disclosed method solves this problem by applying an overlay that highlights the user's active information box, and disabling or correcting problematic event handlers associated with dynamic UI elements such as the drop-down.

Similar to the previous webpage examples, the address form webpage 92 would be manually analyzed for features of interest to assistive software and instructions would be created to provide notice of the various informational spaces including the name 94 and drop-down for the state 96. An address form overlay with style sheet information 102 and modified or disabled event handlers 116. These modifications are aimed at making it easier for assistive software to interpret the basic form webpage 92 and further display information contained in the dynamic user interface elements 96 in a manner that can be accessed with a keyboard.

Here the user's name box 94 is highlighted 104 by the address form overlay 102 to show that it is the active box but the address form overlay 102 does not otherwise hinder the user's interaction with the basic address form webpage 92. As previously stated, when the user selects the name box 94 in the sixth browser window 100, the data entered is not routed through or stored by the assistive system server 18 but instead goes straight to the web server 12. The address form overlay 102 does not handle any of the data entered in the underlying address form webpage 92. The assistive system server 18 may be put on notice of the need for a subsequent overlay based on the previous overlays requested by the browser 14 or an instruction to the same effect, but the user's interactions remain exclusively with the underlying web server 12.

An additional feature of the address form overlay 102 is the event handler correction 116. Here the address form overlay 102 disables, modifies, or replaces problematic event handling for the state drop down 96 in a manner that is easier for keyboard-only users to process and consequently better tailored for persons with disabilities using only the keyboard. Again the address form overlay 102 does not interfere with the user's data input and all information is communicated directly to the web server 12. One skilled in the art will also appreciate that while a drop down 96 was used as an example, the presentation of other forms such as pop up calendars and clickable menus may be modified for keyboard-only use or other behavior without deviating from the scope of the present invention.

In the examples from FIGS. 3-5, the current method disclosed that the basic webpages would need to be examined manually to identify areas of interest for assistive software and create instructions so that the assistive system server 18 could supply the proper overlay. While not disclosed herein, one skilled in the art will appreciate that such manual operations could be automated to identify previously indicated features on webpages or the like. Many additional changes can be made to any webpage that cannot all be described herein. Additionally, accessing the underlying code would enable instructions for the assistive system server 18 to be embedded automatically within the webpages from the web server 12.

A process will now be described though which a production component 18 may be alerted by presentation instructions for the overlays. First the webpages are examined for elements that will require overlays to comply with accessibility guidelines. Without accessing the underlying webpage code, the basic presentation of the webpage is examined and an overlay is created in the production component 18 that contains the corrections for the identified accessibility issues, such as those seen in FIGS. 3-5. This process is performed for all the pages where accessibility is an issue and the corresponding overlays are stored in the production component 18. The webpage owner then embeds an instruction, which may be placed in the webpage code or in the URL, which alerts the browser 14 to the availability of a corrective overlay in the production component 18. Alternatively, a second process of identifying and embedding presentation instructions can be performed with access to the underlying webpage code by first identifying elements that need correction and then automatically inserting presentation instructions into the webpage. In this way, repetitive elements like form boxes 94 can be given presentation instructions iteratively once the first occurrence is manually identified. One skilled in the art will appreciate that access to the underlying webpage code is not necessary, but enables a reduction in amount of manual identification and further allows for automatic identification of repeated elements across many webpages. Once the elements are identified and presentation instructions are created, the second process is very similar to the first process with the corresponding overlay stored in the production component 18 and retrievable upon a request from the browser 14. One skilled in the art will also appreciate that in the case where presentation instructions are embedded in the underlying webpage code (or otherwise downloaded to the browser (e.g., a Java® script) in a manner that permits the presentation instruction to review and/or monitor the information presented on the browser), overlays specific to each element, rather than the entire webpage, can be stored and transmitted by the production component 18 to allow for flexible adjustments in webpage presentation.

The assistive system server 18 further employs several security measures to prevent unauthorized access to the overlays stored therein and protect sensitive user information. A simplified schematic view of the assistive system server 18 including a security monitoring system 40 is generally shown in FIG. 6. The assistive system server 18/production component may include production server 30, a repository file system 32, local public key certificates 34 for the CVS, and a certificate validation server 36. The production server 30 is operable to receive, transmit, and process digital information for the assistive system server 18. The repository file system 32 stores all of the dynamic and static site-specific overlays along with their associated signatures for the assistive system server 18. The local CVS certificates 34 store the public key of the CVS 36 to confirm the identity of the CVS 36. The CVS 36 stores the public key certificates of persons approved to create signatures that are used to determine which overlays stored in the repository file system 32 have been approved for use.

The motivation for the disclosed arrangement of the assistive system server 18 is to make the system less susceptible to unauthorized access. If the security of the overlays stored in the repository file system 32 were compromised, overlays could be used as intermediaries to transmit personal information to an undesired third party. Where more than one production server 30 is deployed, a separate CVS 36 further allows a central point from which public key certificates can be controlled and revoked should a persons approval to create signatures be removed.

Figure 7:
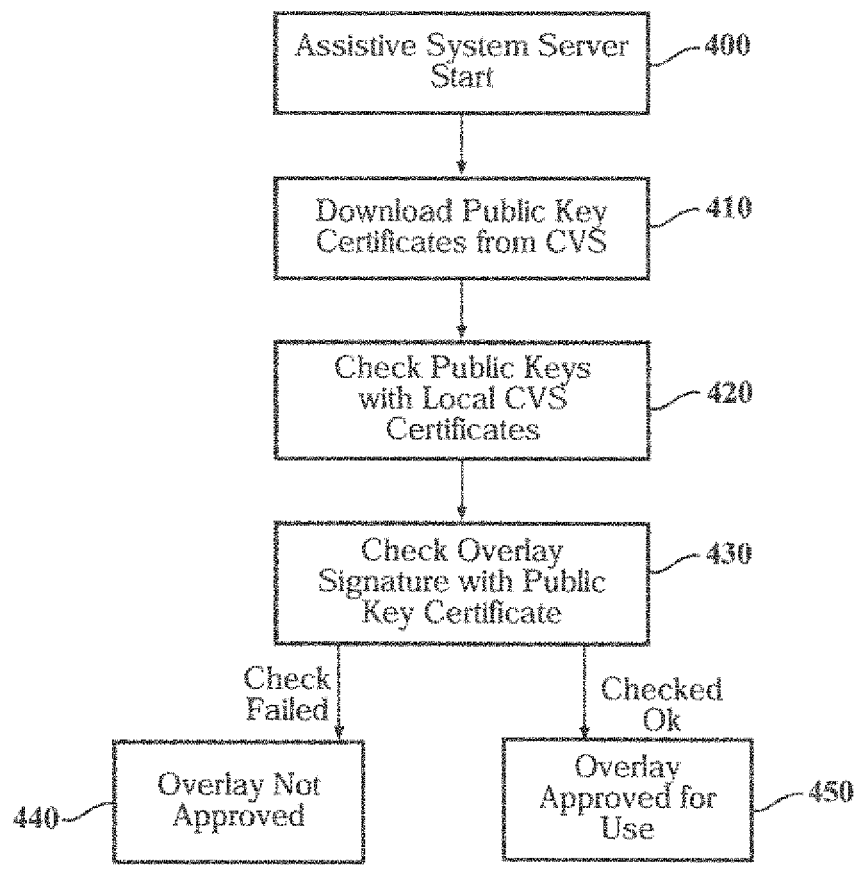
FIG. 7 is a flowchart of an implementation of the system security.

FIG. 7 is a flowchart that depicts an exemplary process that may be used by the assistive system server 18 to confirm the authenticity of the overlays stored in the repository file system 32. The assistive system server 18 starts in step 400 and proceeds to step 410 where the production server 30 downloads from the certificate validation server (CVS) 36 the public key certificates of all persons authorized to create overlay signature files. The public key certificates are each accompanied by a digitally signed message-digest of the public key certificates, signed by the private key of the CVS 36. Following the download, in step 420 the production server 30 checks the validity of the message-digests against the local CVS certificates 34. This confirms that the public key certificates have originated from an autorized CVS 36 and not an impostor system. If a public key certificate is accompanied by a valid message-digest it is held in memory by the production server 30, if not the public key certificate is ignored and not stored in memory. In step 430 the production server 30 checks that the signature of each overlay in the repository file system 32 matches at least one public key certificate in memory. If an overlay signature has a matching public key certificate that signature has been validated. Overlays may be signed by one or more approved persons, and the security policy of the operators of the system must specify the number of required valid signatures for an overlay to be approved. If the number of validated signatures for an overlay equals or exceeds this minimum required, the overlay is approved for use and the process moves to step 450. However, if the count of overlay signature validated is less than the minimum required the overlay is rejected and the process moves to step 440.

In one arrangement, no one person has access to both the repository file system 32 and the CVS 36. This prevents someone from gaining unilateral control over the assistive system server 18, and allows the customer to modify the set of approved overlays by activating or deactivating certificates on the CVS 36. The production server 30, repository file system 32, and the local CVS public key certificate 34 may also be remote and distant from the CVS 36 to further protect against unauthorized access.

A third preventative security measure of the system is carried out by the security monitor 40. As with the relation between the production server 30 and the CVS 36, the security monitor 40 may be remote and distant from the former two components and individual administrative access should be restricted to only one of the three certificate validation measures. The security monitor 40 may have a security repository 42 that may be copied from the repository file system 32. The security monitor 40 may also appear to function as the browser of a user, and iteratively requests web page overlays from the production server 30 and compare the presented overlay against the overlays stored in the security repository 42. In this way, if somehow the security of both the production server 30 and the CVS 36 was compromised and counterfeit overlays were authorized, the security monitor 40 may function as a last line of defense and be alerted to the erroneous overlays.

Having thus disclosed various embodiments of a system and method, various other improvements will become apparent to those of skill in the art that do not depart from the scope of the present invention.

We claim:

1. A method comprising:
providing a production component including a processor, a database, a memory and being operable to transmit, process, and receive digital information, the database storing a plurality of overlays corresponding to the presentation of each static and dynamic component of a predetermined digital document, each overlay including an instruction operable to affect the presentation of the predetermined digital document when the predetermined digital document is accessed by assistive software, wherein the dynamic component changes without user input;
receiving, by the production component, a presentation instruction from a remote station that is displaying the predetermined digital document, wherein the presentation instruction is created based on a determined fingerprint identified from the predetermined digital document without accessing underlying code of the digital document, wherein the fingerprint identifies elements of the predetermined digital document that are modified by the plurality of overlays;
comparing, by the production component, of the presentation instruction received from the remote station displaying the predetermined digital document against the plurality of overlays;
transmitting, from the production component, to the remote station displaying the predetermined digital document the instruction from the overlay that corresponds to the presentation instruction;
monitoring the dynamic component for an automatic change; and
in response to detecting the automatic change to the dynamic component, providing an updated overlay for the dynamic component for display.

2. The method of claim 1, wherein each overlay includes a signature file.

3. The method of claim 2, wherein the memory of the production component comprises a plurality of public key certificates, and the signature file for each overlay is compared by the production component against the plurality of public key certificates.

4. The method of claim 3, further comprising a certificate validation component including a second plurality of public key certificates, and each public key certificate of the production component being compared by the production component against the plurality of public key certificates of the certificate validation component.

5. The method of claim 4, further comprising a security monitor component including a database, the database of the security monitor component including an identical copy of the plurality of overlay files;
matching by the security monitor of the plurality of overlay files of the security monitor component against the plurality of overlay files of the production component; and
the security monitor component operating to transmit an alert if an overlay file of the security monitor does not match an overlay of the production component.

6. The method of claim 1, wherein the presentation instruction comprises uniform resource locator information.

7. The method of claim 1, wherein the transmitted instruction comprises cascading style sheet information.

8. The method of claim 1, wherein the transmitted instruction comprises information operable to affect the presentation of the predetermined digital document so that the presentation of the predetermined digital document complies with predetermined accessibility guidelines.

9. The method of claim 8, wherein the transmitted instruction comprises color correction information.

10. The method of claim 1, wherein the overlay file comprises a static overlay file.

11. The method of claim 1, wherein the overlay file comprises a dynamic overlay file.

12. The method of claim 1, wherein the predetermined digital document is a webpage.

13. The method of claim 12, wherein the presentation instruction comprises a URL of a webpage and the predetermined digital document is identified by the production component using the URL of the webpage.

14. The method of claim 1, wherein the predetermined digital document comprises at least one digital image.

15. The method of claim 1, further comprising a security monitor component including a database, the database of the security monitor component including an identical copy of the plurality of overlay files;
matching by the security monitor of the plurality of overlay files of the security monitor component against the plurality of overlay files of the production component; and
the security monitor component operating to transmit an alert if an overlay file of the security monitor does not match an overlay of the production component.

16. A method comprising:
providing a production component, a security component, the production component including a processor, a database, a memory and being operable to transmit, process, and receive digital information;
the production component including a plurality of overlay files corresponding to the presentation of each static and dynamic component of a predetermined digital document each overlay file including an instruction operable to affect the presentation of the predetermined digital document when the predetermined digital document is accessed by assistive software, wherein the dynamic component changes without user input;
validating by the security component the integrity of each overlay file;
receiving by the production component a presentation instruction from a remote station that is displaying the predetermined digital document, wherein the presentation instruction is created based on a determined fingerprint identified from the predetermined digital document without accessing underlying code of the predetermined digital document, wherein the fingerprint identifies elements of the predetermined digital document that are modified by the plurality of overlay files;
comparing by the production component of the presentation instruction received from the remote station displaying the predetermined digital document against the plurality of overlay files;

transmitting from the production component to the remote station displaying the predetermined digital document the instruction from the overlay file that corresponds to the presentation instruction;
monitoring the dynamic component for an automatic change;
detecting the automatic change in the dynamic component;
determining whether to execute an updated overlay over the dynamic component; and
in response to determining to execute the updated overlay, providing the updated overlay for display over the dynamic component.

17. The method of claim 16 wherein the validating by the security component comprises:
(a) the security component including a validation component and a security monitor component;
(b) each overlay file including a first security file;
(c) the production component further comprising a second security file;
(d) the validation component including a third security file;
(e) the second security file of the production component being compared against the third security file; and
(f) the security monitor component including an identical copy of each overlay file of the production component, and the security monitor component operating to compare each overlay file on the security monitor component against each overlay file on the production component to validate the integrity of the overlay files.

18. The method of claim 16, wherein the presentation instruction comprises uniform resource locator information.

19. The method of claim 16, wherein the transmitted instruction comprises cascading style sheet information.

20. The method of claim 16, wherein the transmitted instruction comprises information operable to affect the presentation of the predetermined digital document so that the presentation of the predetermined digital document complies with predetermined accessibility guidelines.

21. The method of claim 16, wherein the predetermined digital document comprises at least one digital image.

22. A method comprising:
providing a production component including a processor, a database, a memory and being operable to transmit, process, and receive digital information, the database storing a plurality of overlay files corresponding to the presentation of each static and dynamic component of a predetermined digital document, each overlay file including an instruction operable to affect the presentation so that the predetermined digital document complies with predetermined accessibility guidelines when accessed by predetermined assistive software, wherein the dynamic content changes without user input;
providing a remote station including a display presenting the predetermined digital document;
receiving by the production component a presentation instruction from a remote station that is displaying the predetermined digital document, wherein the presentation instruction is created based on a determined fingerprint identified from the predetermined digital document without accessing underlying code of the predetermined digital document, wherein the fingerprint identifies elements of the predetermined digital document that are modified by the plurality of overlay files;
comparing by the production component of the presentation instruction received from the remote station displaying the predetermined digital document against the plurality of overlay files;
transmitting from the production component to the remote station displaying the predetermined digital document the instruction from the overlay instruction;
modifying the presentation of the predetermined digital document presented on the display on the remote station so that the appearance of the predetermined digital document complies with the accessibility guidelines when accessed by predetermined assistive software;
monitoring the dynamic component for an automatic change; and
in response to detecting the automatic change to the dynamic component, providing an updated overlay for the dynamic component for display.

23. The method of claim 22, wherein the presentation instruction comprises uniform resource locator information.

24. The method of claim 22, wherein the transmitted instruction comprises cascading style sheet information.

25. The method of claim 22, wherein the predetermined digital document comprises at least one digital image.

26. The method of claim 22, wherein the predetermined digital document comprises a form element.

27. The method of claim, 26 wherein the form element comprises at least one of a drop-down menu or a clickable menu.

28. The method of claim 26, wherein the transmitted instruction comprises information operable to affect the presentation of the predetermined digital document so that the presentation of the predetermined digital document information complies with predetermined accessibility guidelines.

29. The method of claim 22, wherein the presentation of the predetermined digital document on the remote station is modified so that the presentation of the predetermined digital document complies with accessibility guidelines.

30. A method comprising:
providing a production component including a processor, a database, a memory and being operable to transmit, process, and receive digital information, the database storing a plurality of overlay files corresponding to the presentation of each static and dynamic component of a predetermined digital document, each overlay file including an instruction operable to affect the presentation so that the predetermined digital document, wherein the dynamic component changes without user input;
providing a remote station including a display presenting the predetermined digital document;
providing on the remote station a presentation instruction operable to identify one or more elements of the predetermined digital document, and the presentation instruction operating to generate an overlay request, wherein the presentation instruction is created based on a determined fingerprint identified from the predetermined digital document without accessing underlying code of the predetermined digital document, wherein the fingerprint identifies elements of the predetermined digital document that are modified by the plurality of overlay files;
receiving by the production component from the remote station of an overlay request;

comparing by the production component of the overlay request received from the remote station against the plurality of overlay files;

transmitting from the production component to the remote station of an instruction from the overlay file of the plurality of overlay files that corresponds to the received overlay request;

modifying the display of the predetermined digital document on the remote station;

monitoring by the production component the dynamic component for an automatic change; and in response to detecting the automatic change to the dynamic component, providing by the production component an updated overlay for the dynamic component without altering the source code associated with the presentation.

31. The method of claim 30, wherein the overlay request comprises a URL.

32. The method of claim 30, wherein the presentation instruction provided on the remote station is transmitted by the production component to the remote station prior to the remote station including a display presenting the predetermined digital document.

33. The method of claim 30, wherein the display of the predetermined digital document on the remote station is modified so that the displayed predetermined digital document with predetermined accessibility guidelines.

34. The method of claim 30, wherein the presentation instruction monitors the predetermined digital document for changes to the display of the predetermined digital document and transmits an overlay request to the production component in response to a change in the display of the predetermined digital document.

35. The method of claim 34, wherein changes to the predetermined digital document comprises at least one of the addition or removal of an element to the display of the predetermined digital document.

36. The method of claim 35, wherein the addition of an element to the display of the predetermined digital document comprises the opening of a chat window in a browser.

37. The method of claim 30, comprising transmitting the presentation instruction from a remote server to the remote station.

38. The method of claim 37, wherein the remote server comprises the production component.

39. The method of claim 30, wherein the overlay request comprises data generated by the presentation instruction so that none of the predetermined digital document is transmitted to the production component.

* * * * *